US012225320B2

(12) United States Patent
Ooi et al.

(10) Patent No.: US 12,225,320 B2
(45) Date of Patent: Feb. 11, 2025

(54) MULTIPLE CAMERA FIELD OF VIEW FRAME STITCHING

(71) Applicant: Dell Products L.P., Round Rock, TX (US)

(72) Inventors: Ghee Beng Ooi, Singapore (SG); Chih-Hao Kao, New Taipei (TW); Karthikeyan Krishnakumar, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 232 days.

(21) Appl. No.: 17/946,391

(22) Filed: Sep. 16, 2022

(65) Prior Publication Data

US 2024/0098212 A1 Mar. 21, 2024

(51) Int. Cl.
| | |
|---|---|
| H04N 5/265 | (2006.01) |
| G06T 7/00 | (2017.01) |
| G06T 7/70 | (2017.01) |
| G06T 7/80 | (2017.01) |
| H04N 5/268 | (2006.01) |
| H04N 7/10 | (2006.01) |
| H04N 17/00 | (2006.01) |
| H04N 23/51 | (2023.01) |
| H04N 23/698 | (2023.01) |
| H04N 23/90 | (2023.01) |
| H04N 23/951 | (2023.01) |

(52) U.S. Cl.
CPC .............. *H04N 5/265* (2013.01); *G06T 7/70* (2017.01); *G06T 7/80* (2017.01); *G06T 7/97* (2017.01); *H04N 5/268* (2013.01); *H04N 7/10* (2013.01); *H04N 17/002* (2013.01); *H04N 23/51* (2023.01); *H04N 23/698* (2023.01); *H04N 23/90* (2023.01); *H04N 23/951* (2023.01); *G06T 2207/30204* (2013.01)

(58) Field of Classification Search
CPC .......... H04N 5/265; H04N 5/268; H04N 7/10; H04N 17/002; H04N 23/51; H04N 23/698; H04N 23/90; H04N 23/951; H04N 7/142; H04N 23/45; G06T 7/70; G06T 7/80; G06T 7/97; G06T 2207/30204; G06T 3/4038; G06T 7/33
See application file for complete search history.

(56) References Cited

U.S. PATENT DOCUMENTS 8,988,558 B2 * 3/2015 Chong ................. H04N 23/662
  348/211.3
10,486,596 B2 11/2019 Rathi et al.
(Continued)

*Primary Examiner* — Shahbaz Nazrul
(74) *Attorney, Agent, or Firm* — Zagorin Cave LLP; Robert W. Holland

(57) ABSTRACT

Plural cameras cooperate to define an overlap of fields of view that consolidate to provide an extended field of view communicated to an information handling system. The plural cameras stitch the non-overlapping portions into a consolidated visual image by reference to a landmark captured by both cameras in the overlapping portion, such as a reference marker placed in the extended field of view. The plural cameras coordinate through a wireless interface or with a daisy chain of communication cables to share the overlap boundary, resolution compatibility and an architecture for communicating the consolidated field of view with the information handling system.

16 Claims, 4 Drawing Sheets

(56) References Cited

U.S. PATENT DOCUMENTS

| | | | |
|---|---|---|---|
| 2010/0097443 A1* | 4/2010 | Lablans | H04N 23/67 |
| | | | 348/E7.001 |
| 2016/0295108 A1 | 10/2016 | Cao | |
| 2017/0111580 A1* | 4/2017 | Chang | G06K 15/027 |
| 2017/0289449 A1* | 10/2017 | Muramoto | H04N 23/45 |
| 2017/0363949 A1 | 12/2017 | Valente et al. | |
| 2021/0337118 A1 | 10/2021 | Adsumilli et al. | |
| 2022/0067972 A1* | 3/2022 | Momcilovic | G06T 7/73 |

* cited by examiner

MULTIPLE CAMERA FIELD OF VIEW FRAME STITCHING

BACKGROUND OF THE INVENTION

Field of the Invention

The present invention relates in general to the field of information handling system cameras, and more particularly to an information handling system multiple camera field of view frame stitching.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems integrate processing components in a housing to execute instructions that process information for presentation at a display. Desktop information handling systems generally operate in a stationary manner interfaced through peripheral devices, such as a peripheral display, keyboard, mouse and camera. Portable information handling systems generally integrate a display, keyboard, touchpad and camera in a housing and also can interface with peripheral devices.

Information handling systems provide a powerful communication tool for individuals and enterprises, particularly in the support of videoconferences. End users from diverse geographical areas can meet in virtual conferences that support visual and audio communication. An integrated or peripheral camera readily supports single end users who join a video conference since the end user can focus the camera on herself. Cameras can be more difficult to use when a videoconference supports a group of plural participants, such as in a conference room. Typically, a conference room video camera has a wide field of view, such as a fisheye lens, so that all participants can be captured. When a particular participant is the focus of the conference, such as by speaking, the camera is digitally zoomed to highlight the speaker.

One difficulty with this approach is that visual images presented from a digital zoom tend to lose quality as the resolution of the visual image decreases. Further, when the digitally zoomed portion of the video comes from an edge of the image, the lens tends to add distortion that causes the image to look artificial and unnatural. More advanced cameras generally include processing resources that help to improve the quality of captured visual images, such as an image signal processor (ISP) to aid in rendering a video stream and to adjust images for white balance, auto exposure, auto focus and image quality tuning. In some instances, cameras designed for use in conference rooms will include additional processing resources to help manage digital manipulation of captured visual images. Other conference room camera systems will include multiple cameras that have different types of lenses so that a wide and narrow field of view are available. These types of camera systems tend to be expensive and difficult to use.

SUMMARY OF THE INVENTION

Therefore, a need has arisen for a system and method which provides high quality wide field of view visual images.

In accordance with the present invention, a system and method are provided which substantially reduce the disadvantages and problems associated with previous methods and systems for capturing wide field of view visual images. Plural cameras cooperatively define a boundary for an overlap between the camera fields of view to consolidate captured visual images in a consolidated visual image having at least some of the visual information from non-overlapping portions of visual images taken by the plural cameras.

More specifically, plural cameras deploy to an area with an overlap of the camera fields of view. The cameras define an overlap area of the fields of view, such as by comparing a position of an object or reference marker shared in both fields of view, so that a consolidated visual image is generated that combines a non-overlap portion of a secondary camera visual image with a visual image captured by the primary camera and communicates the consolidated visual image to an information handling system, such as to support a videoconference. In one embodiment, the plural cameras automatically detect each other and share a visual image to define a boundary of the overlap in the visual images and configure one of the plural cameras as a primary camera that generates the consolidated visual image. The primary camera interfaces with an information handling system and the secondary camera(s) so that the primary camera manages the generation of the consolidated visual image with non-overlapping portions received from the secondary camera and presents itself to the information handling system as the only camera in the position, such as in a conference room.

The present invention provides a number of important technical advantages. One example of an important technical advantage is that a location, such as a conference room, has high quality visual images captured with a wide field of view that does not distort when digitally manipulated, such as by a zoom to a narrow portion of the visual image. An end user is provided with high quality visual images to digitally manipulate from a wide field of view generated by plural cameras in an automated manner and interfaced like a single camera.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Plural cameras coordinate image capture to provide a consolidated field of view visual image to an information handling system. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
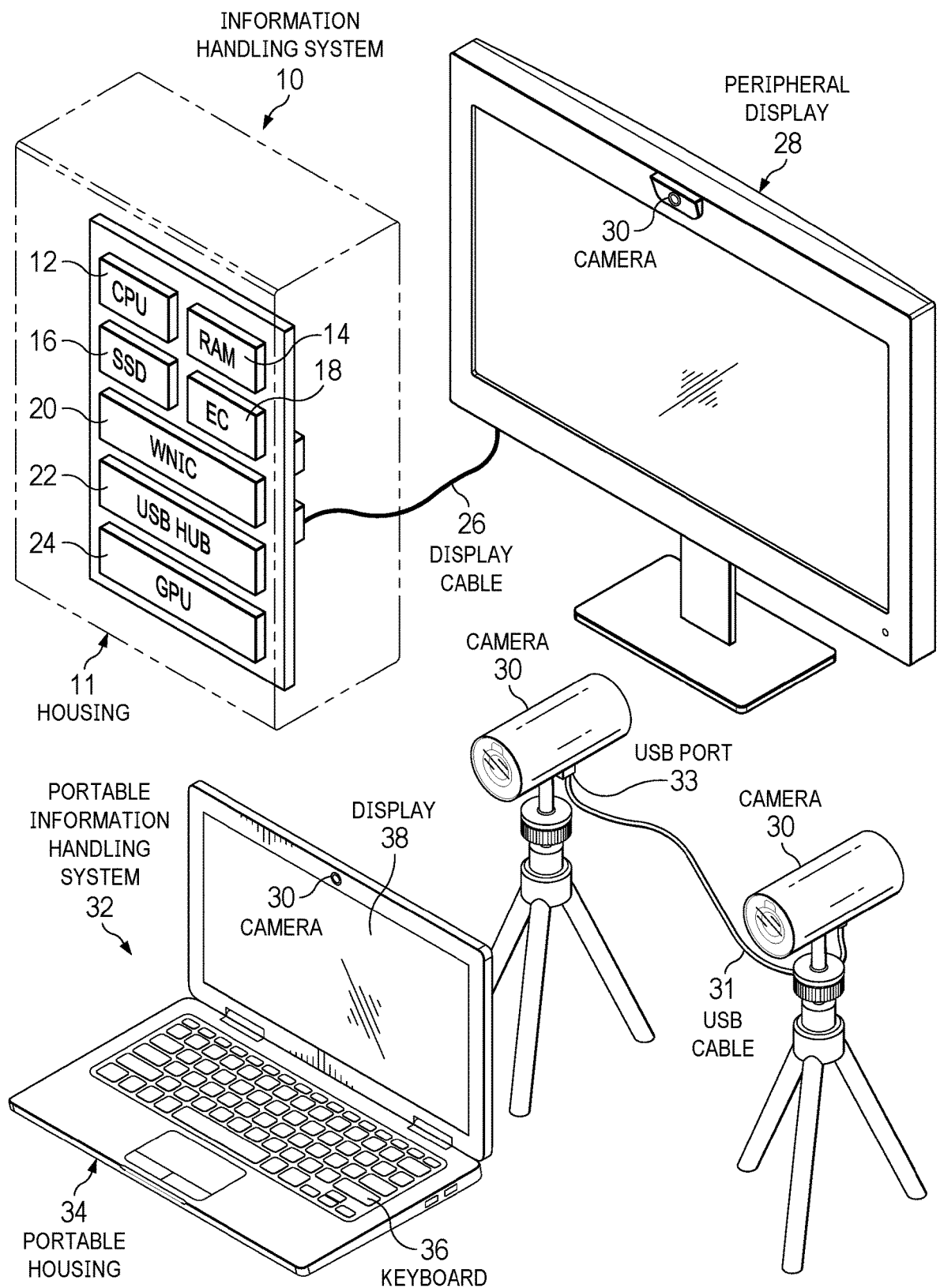
FIG. 1 depicts a desktop information handling system and a portable information handling system interfaced with plural cameras that stitch plural fields of view into a consolidated field of view.

Referring now to FIG. 1, a desktop information handling system 10 and a portable information handling system 34 interface with plural cameras that stitch plural fields of view into a consolidated field of view. In the example embodiment, desktop information handling system 10 processes information with processing components disposed in a housing 11 configured to operate at a fixed location. A central processing unit (CPU) 12 executes instructions that process information in cooperation with a random access memory (RAM) 14 that stores the instructions and information. A solid state drive (SSD) 16 includes non-transitory memory that persistently stores instructions and information during power of the system, such as an operating system and applications that are retrieved at power up by preboot instructions of an embedded controller (EC) 18. Embedded controller 18 manages system operations on a physical level, such as application of power, maintenance of thermal constraints and interactions with peripheral devices. A wireless network interface controller (WNIC) 20 supports wireless communication through a radio, such as with WIFI or Bluetooth. A USB hub 22 has plural USB ports to communicate with external devices, such as peripheral devices, such as with USB Type A, B or C ports. A graphics processing unit (GPU) 24 further processes information to define visual images for presentation at a peripheral display 28, such as by defining pixel values that are communicated through a display cable to peripheral display 28. For example, display cable 26 is a USB Type C cable that support graphical and data communications through a plurality of serial links.

The example embodiment also depicts a portable information handling system 32 built in a portable housing 34 that supports mobile use with an integrated display 38 and keyboard 36. Portable information handling system 32 includes the processing components described with respect to desktop information handling system 10 that cooperate to process information, such as a CPU and RAM that cooperate to execute instructions of an application. The example embodiment has a clamshell configuration of the portable housing 34 that rotates between open and closed positions; alternative embodiments might have a tablet configuration built in a planar portable housing. A camera 30 integrates in portable housing 34 to capture visual images of a field of view associated with an end user viewing integrated display 38. Portable information handling system 32 may interface with peripheral display 28 to present visual images. In the example embodiment, peripheral display 28 also includes a camera that captures visual images of a field of view associated with an end user viewing peripheral display 28. In this way, both portable information handling system 32 and peripheral display 28 may support a videoconference with images captured by the integrated camera 30.

In the example embodiment, plural peripheral cameras 30 are disposed external to the information handling systems and peripheral display to support capture of visual images, such as to support a videoconference. In an alternative embodiment, a camera integrated in an information handling system or display may be used to generate a consolidated visual image, either with another integrated camera or a peripheral camera. The peripheral cameras 30 interface with an information handling system and with each other through wireless communication, such as WIFI or BLUETOOTH, or through a cable, such as a Type C USB cable. Peripheral cameras 30 cooperate to define overlaps in their respective fields of view so that a consolidated field of view provided by the peripheral cameras offers a wider field of view to use by the information handling systems with full camera resolution than would be available from each camera separately. The cooperation between peripheral camera 30 is coordinated with logic included in the cameras that communicates by wireless signals or through a daisy chain of communication cables, such as the Type C USB cable 31 that couples to a USB port 33 of each peripheral camera. In one embodiment, plural cameras cooperate by exchanging field of view information and defining a boundary of an overlap of the fields of view to use as a reference for stitching a consolidated field of view. Once the boundary intersection for the overlapping and non-overlapping portions are defined, the consolidated visual image is stitched from the separate camera visual images by reference to common objects in the visual images, such as with the You Only Look Once (YOLO) algorithm that identifies a user or object in both visual images. In addition, the stitching of the visual images may include fine tuning with edge detection algorithms, such as Sobel, Canny, or Fuzzy Logic. As an example, a typical YOLO algorithm operating on graphics processing resource can process 155 frames per second, sufficient for video.

Figure 2:
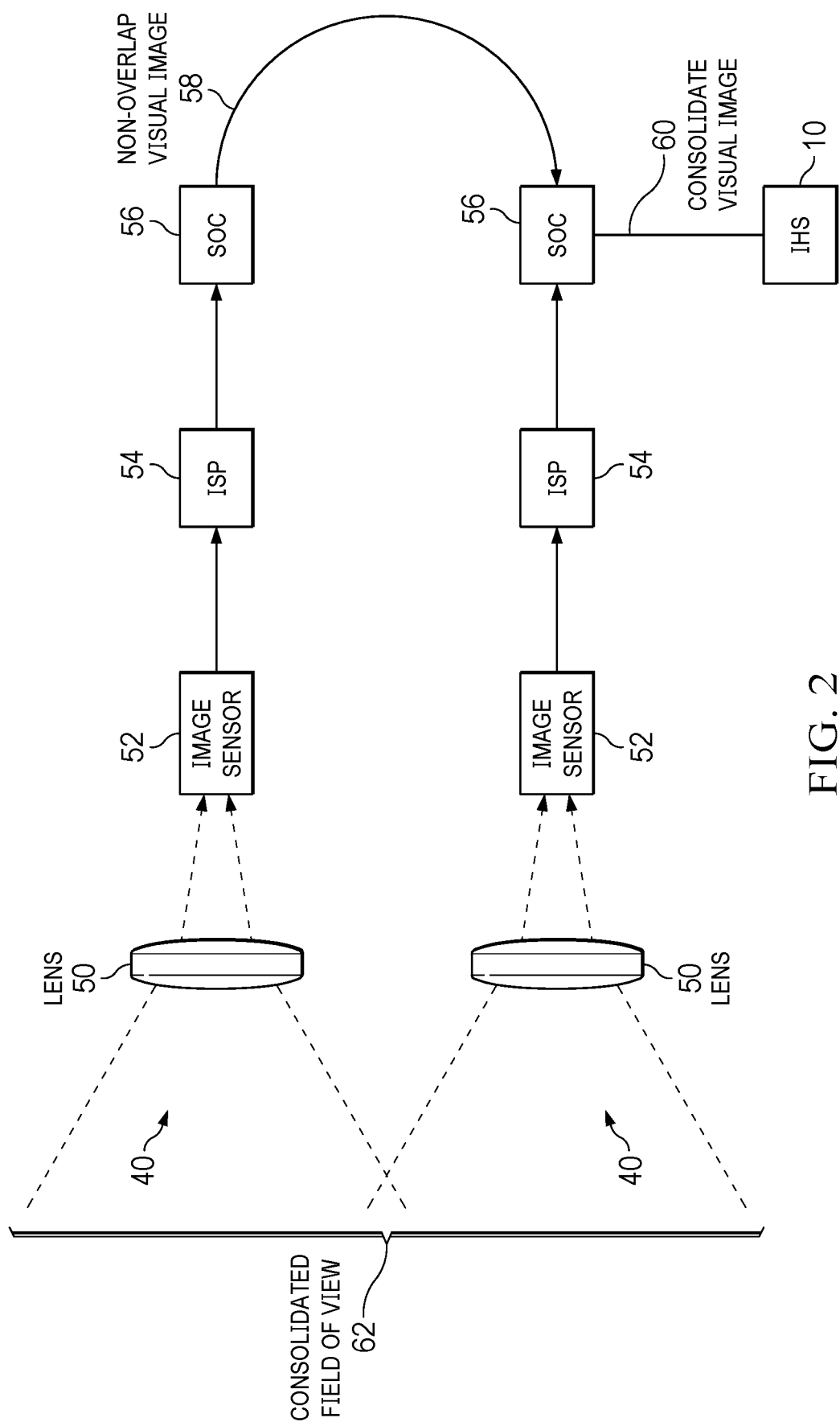
FIG. 2 depicts plural cameras that coordinate visual image capture to provide a consolidated field of view.

Referring now to FIG. 2, plural cameras coordinate visual image capture to provide a consolidated field of view 62. Each camera has a lens 50 that captures light from a field of view 40 and directs the light to an image sensor 52 that captures the visual images with an array of pixels that provide a composite visual image of raw pixel values typically using megapixel resolution. An image sensor processor (ISP) 54 accepts the image sensor pixel information and offers a variety of processing techniques to enhance image quality, such adjusting for ambient light brightness and color. ISP 54 may report the raw pixel values for communication as a visual image or can perform compression, such as MP4 compatible video compression that reduces the size of the visual image. A system on chip (SOC) processing resource 56 manages communication of the visual images from each camera, such as with an integrated radio that communicates through WIFI or BLUETOOTH or by a wire interface such as USB Type C. In one embodiment, each camera communicates separately to an information handling system that separately processes the visual images with each field of view 40 to generate the consolidated field of view 62. A disadvantage to this approach is that the information handling system interfaces with each camera separately and manages a compressed version of the visual image.

In the example embodiment, the cameras communicate directly with each other to coordinate generation of the consolidated visual image at one of the cameras so that only that camera needs to maintain communication with the information handling system. For instance, a USB cable interface provides rapid communication of raw pixel values from one camera to the other so that a precise image stitching may take place. Alternatively, a compressed visual image may be used. Once the cameras define the overlap boundary, the secondary camera may send only non-overlap visual images 58 to the primary camera so that the amount of communicated visual images is reduced and the primary camera need manage stitching only with inclusion of non-overlapping images rather than removing portions of the secondary camera that overlap. Once the primary camera receives the non-overlapping visual images 58, a graphical processing resource at the primary camera stitches the non-overlapping visual images into the consolidated visual image 60 for communication to the information handling system 10. For example ISP 54 or SOC 56 accepts raw pixel values, stitches the visual images based on a boundary defined at configuration and then compresses the visual image to an MP4 or similar format. Pre-configuration of the boundary for stitching the visual images provides more rapid processing to generate the consolidated visual image. During capture of visual images, the cameras are monitored for movement, such as with an accelerometer or movement relative to a fixed reference point, so that at detection of movement a re-calibration of the boundary between the camera fields of view may be commanded.

Figure 3:
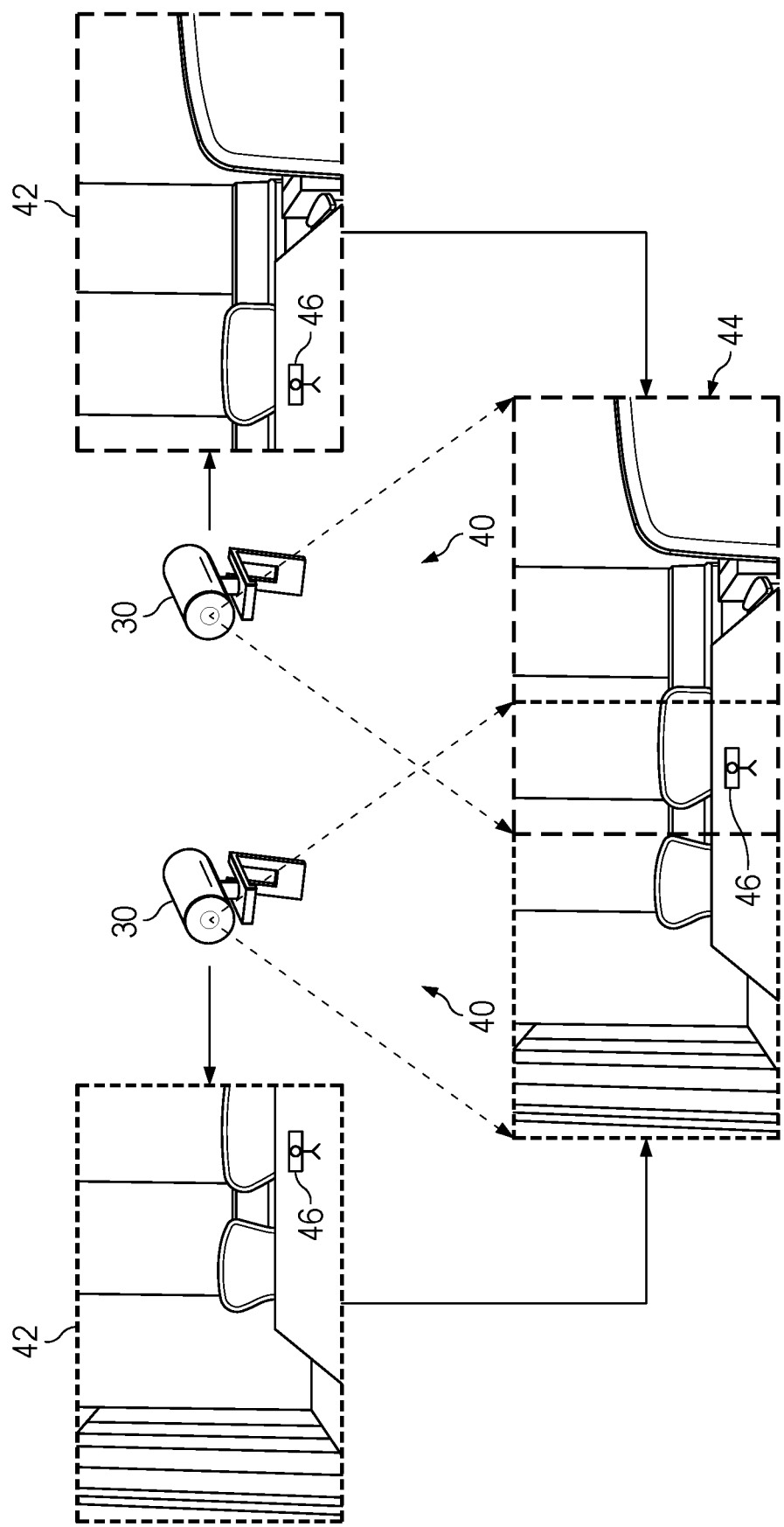
FIG. 3 depicts an example of plural cameras configured to overlap fields of view that coordinate to provide a consolidated field of view.

Referring now to FIG. 3, an example depicts plural cameras 30 configured to overlap visual image fields of view 40 that coordinate to provide a consolidated field of view visual image 44. In the example embodiment, a reference marker 46 is placed in each camera 30 field of view 40 to provide a reference in the visual images captured by each camera from which the boundary for stitching the visual images can be determined. For instance, reference marker 46 is a printed QR code that has an identifier and dimensions. A processing resource on each camera 30 reads the identifier and queries other local cameras to determine if the reference marker is in any other captured visual images 42. If so, then the dimension information and the resolution of the visual images provides a relative distance of each camera to the reference marker so that the consolidated visual images 44 can align along the boundary. If a reference marker is not found, then a shared object may be used instead. In the example embodiment, the two camera visual images 42 both have the reference marker in an overlapping portion. The primary camera applies its entire captured visual image stitched with the non-overlapping portion of the visual image of the secondary camera. As a result, consolidated visual image 44 has a wider field of view than any individual camera can offer without sacrificing visual image quality or introducing distortions. In alternative embodiments, more than two cameras may be used so that a wide enough field of view is available from the consolidated visual image without relying on fisheye types of lens. In the example embodiment, one primary camera 30 is visible to information handling systems through a wireless access point having a WIFI interface while the other secondary camera 30 sends the non-overlapping portion of the field of view to the primary camera. This arrangement aids in simplified end user access in a conference room. Alternatively, both cameras may send visual images to an information handling system, such as server, that consolidates the visual image. During configuration, the cameras deduce their position relative to each other so that the area of overlap is generally known. Thus, for example, analyzing to locate the border from the side of the image having the overlap can reduce processing time and processing resource use.

Figure 4:
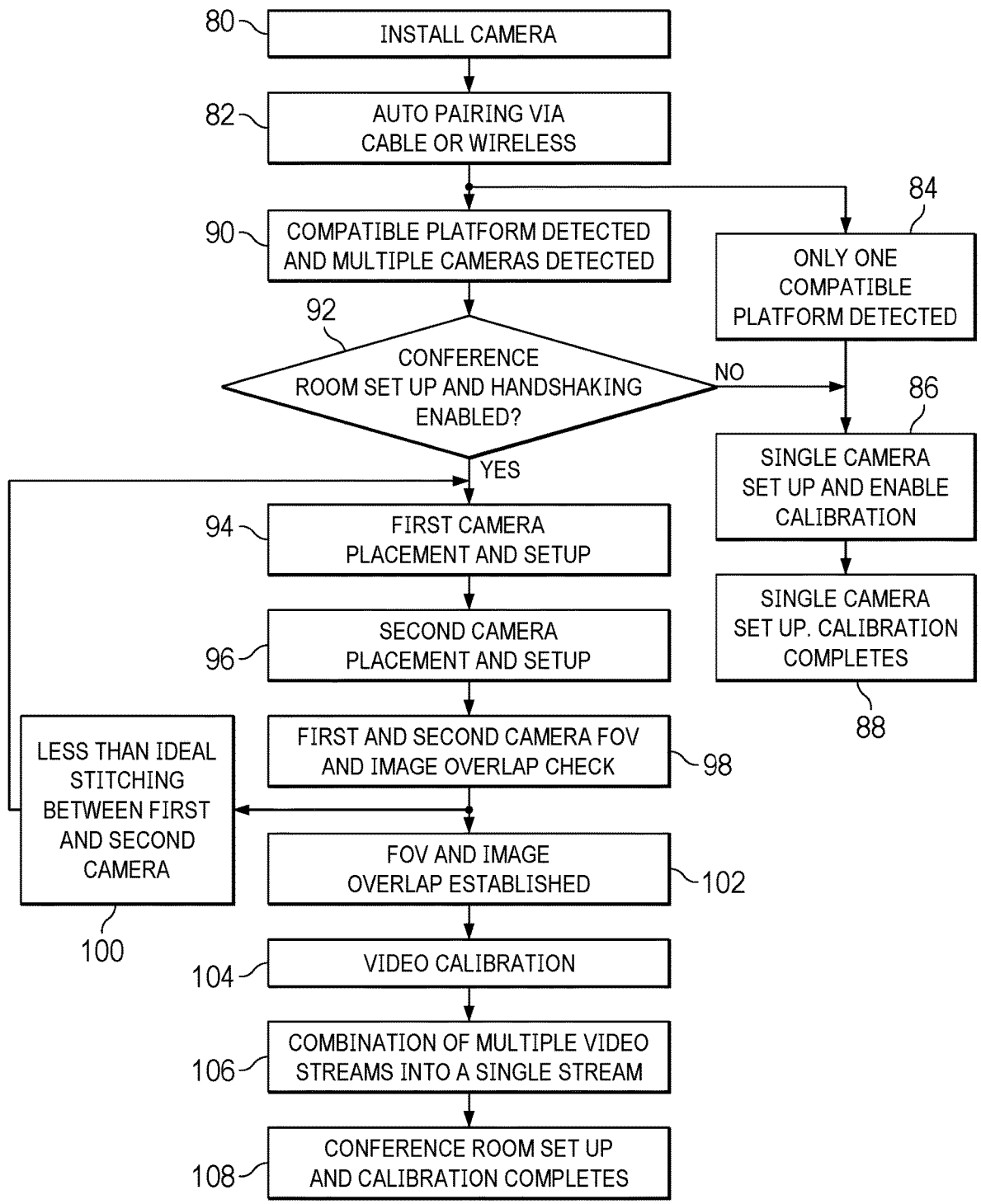
FIG. 4 depicts a flow diagram of a process for configuring plural cameras to provide a consolidated field of view.

Referring now to FIG. 4, a flow diagram depicts a process for configuring plural cameras to provide a consolidated field of view. The process starts at step 80 with installation of a camera at a location, such as by powering up the camera and interfacing the camera with a network resource, such as WIFI, and/or an information handling system. At step 82, the camera attempts to automatically pair with other cameras, such as through a USB cable interface or wireless interface. If only one compatible camera is available, the process continues to step 84 to enter a single camera mode of operation at step 86 and complete a single camera setup and calibration at step 88. If auto pairing at step 82 detects a compatible information handling system platform or a compatible camera, the process continues to step 90 to setup coordination with the resource for capture of visual images with a consolidated field of view. At step 92 a determination is made of whether the camera is configured to allow a conference room setup and consolidated field of view visual image. If not, the process continues to step 86 to perform a single camera setup. If other compatible cameras or information handling systems are available, the process continues to step 94 to setup plural cameras to provide a consolidated visual image with at least some visual information of the consolidated visual image from each of the cameras.

At step 94 a first camera is placed in a location to support a desired field of view and setup is initiated, such as by powering up a BLUETOOTH SOC to advertise compatibility with a consolidated field of view visual image. At step 96 a second camera is placed in a location to support a desired field of view and setup is initiated, such as by powering up a BLUETOOTH SOC to advertise compatibility with a consolidated field of view visual image. At step 98 the first and second camera field of view image overlap is determined, such as by searching for a reference marker or common object in each field of view. The definition of the boundary may be performed locally at one of the cameras by sending the image of the other camera to it or may be performed at an information handling system interfaced with both cameras. If at step 98 the camera visual image overlap is not acceptable to provide stitching that supports a consolidated visual image, the process continues to step 100 and returns to step 94 to provide the end user with another opportunity to position the cameras. If at step 98 the overlap in fields of view is acceptable, the process continues to step 102 to define the field of view overlap. In one embodiment, the fixed location of the cameras allows a precise demarcation of the overlap boundary at the camera raw pixel value level. Alternatively, a compressed image may be used. In either case, the cameras coordinate to assign one camera as the primary that receives a non-overlap portion of the secondary camera visual information for local processing at the primary camera into a consolidated visual image. At step 104 a video calibration is performed and shared between the cameras and at step 106 a combination of both cameras' fields of view into a consolidated field of view is performed by including the non-overlapping portion of the secondary camera in the visual image captured by the primary camera. The video calibration can include an exchange of camera resolution information so that both cameras can command the highest compatible resolution available that will provide a comprehensive consolidated visual image. Calibration may also include adjustments for different sizes of the captured visual images such as due to camera lens configurations and camera distances relative to the boundary identification object. At step 108 the calibration is complete and the cameras monitor for a change of position that initiates a recalibration, such as by monitoring an accelerometer in each camera or changes in the captured visual image of a fixed object position.

Although the present invention has been described in detail, it should be understood that various changes, substitutions and alterations can be made hereto without departing from the spirit and scope of the invention as defined by the appended claims.

What is claimed is:

1. An information handling system comprising:
   a processor operable to execute instructions that process information;
   a memory interfaced with the processor and operable to store the instructions and information;
   a persistent storage device interfaced with the processor and having non-transient memory operable to store the instructions and information;
   a first camera having a lens, an image sensor, a processing resource and a non-transitory memory; and
   a second camera having a lens, an image sensor, a processing resource and a non-transitory memory;
   instructions stored in the first camera non-transitory memory that when executed on the first camera processing resource causes:
   communication of resolution capability with the second camera;
   selection of a common resolution with the second camera;
   retrieval from the second camera of visual images captured by the second camera;
   comparison of the second camera visual images and visual images captured by the first camera to define an overlap;
   stitching of the second camera visual images with the first camera visual images to define a consolidated visual image having at least some of the first camera visual images and the second camera visual images; and
   communicating the consolidated visual image to the processor.

2. The information handling system of claim 1 further comprising:
   a reference marker disposed in the first camera field of view and the second camera field of view;
   wherein the instructions compare a position of the reference marker in the first camera visual image and the second camera visual image to define the overlap.

3. The information handling system of claim 1 further comprising instructions stored in the second camera non-transitory memory that when executed on the second processing resource cause:
   defining a portion of the second camera visual image not in the overlap; and
   communicating to the first camera only the portion of the second camera image not in the overlap.

4. The information handling system of claim 1 further comprising:
   a first communication cable port disposed in the first camera;
   a second communication cable port disposed in the second camera; and
   a cable coupled from the first communication cable port to the second communication cable port, the cable communicating the second camera visual images to the first camera.

5. The information handling system of claim 4 wherein the second camera visual images are communicated in a raw pixel value format.

6. The information handling system of claim 1 further comprising:
   a portable housing;
   wherein:
   the processor and memory are included in the portable housing;
   the first camera integrates in the portable housing; and
   the second camera is a peripheral camera separate from the portable housing.

7. The information handling system of claim 1 wherein:
   the first camera has a first resolution;
   the second camera has a second resolution different from the first camera; and
   the first and second cameras cooperate to select one of the first resolution or the second resolution to capture the visual images.

8. The information handling system of claim 1 further comprising:
   a third camera having a lens, an image sensor, a processing resource and a non-transitory memory;
   wherein the instructions further cause stitching of visual images of the third camera with the first camera visual images and the second camera visual images.

9. The information handling system of claim 8 wherein the instructions select only one of the second camera visual images and third camera visual images at a time to stitch with the first camera visual images.

10. A method for capturing visual images, the method comprising:
   capturing first visual images with a first camera having a first field of view;
   capturing second visual images with a second camera having a second field of view;
   comparing the first and second visual images at one of the first and second cameras to define an overlap of the first visual image and the second visual image;
   communicating the second visual images from the second camera to the first camera;
   stitching at the first camera the first visual image and the second visual image to generate a consolidated visual image based upon the overlap;
   communicating the consolidated visual image from the first camera to an information handling system;
   coupling a communication cable from the second camera to the first camera;

communicating the second visual images from the second camera to the first camera through the communication cable;

communicating the second visual images to the first camera in a raw pixel value format;

compressing the consolidated visual image at the first camera;

providing wireless communication from the first camera to the information handling system; and in response to the coupling a communication cable, suppressing wireless communication at the second camera.

11. The method of claim 10 further comprising:

capturing a reference marker in each of the first visual images and the second visual images; and comparing the reference marker position in the first visual images and the second visual images to determine the overlap.

12. The method of claim 10 further comprising:

defining an overlap portion and non-overlap portion of the second visual images at the second camera; and communicating only the non-overlap portion to the first camera.

13. The method of claim 10 wherein the second camera integrates into a portable information handling system and the first camera comprises a peripheral camera.

14. The method of claim 10 further comprising:

calibrating the first field of view and second field of view;

performing the comparing based upon the calibrating;

detecting movement of the first field of view relative to the second field of view; and in response to the detecting movement, re-calibrating the first field of view and second field of view.

15. A camera comprising:

a lens;

an image sensor aligned with the lens and operable to capture visual images;

a processing resource operable to execute instructions that process information; and a non-transitory memory operable to store instructions that when executed on the processing resource cause:

communication of resolution capability with the external camera;

selection of a common resolution with the external camera;

retrieval from an external camera of visual images captured by the second camera;

comparison of the external camera visual images and the visual images captured by the image sensor to define an overlap;

consolidation of the external camera visual images with the image sensor visual images to define a consolidated visual image having at least some of the external camera visual images and the image sensor visual images based upon the overlap; and communicate the consolidated visual image to an information handling system.

16. The camera of claim 15 further comprising:

a port operable to accept a communication cable coupled to the external camera;

a wireless network interface controller operable to communicate with the information handling system;

wherein the instructions receive the external camera visual images through the communication cable and communicate the consolidated visual image through the wireless network interface controller.

* * * * *